3,210,431
OXYCHLORINATION OF ETHYLENE
Willem F. Engel, Amsterdam, Netherlands, assignor to Shell Oil Company, New York, N.Y., a corporation of Delaware
No Drawing. Filed Apr. 24, 1961, Ser. No. 104,778
Claims priority, application Netherlands, May 30, 1960, 252,104
7 Claims. (Cl. 260—659)

The invention relates to the chlorination of hydrocarbons with the use of cupric chloride, in which the chlorine may be supplied by oxidation of hydrogen chloride.

It is known to chlorinate saturated hydrocarbons by reacting them with hydrogen chloride and oxygen or oxygen-containing gases in the presence of catalysts. As examples of the substances suitable as catalysts the chlorides of copper and the rare earth metals are mentioned. The temperature is in the range of from 300° to 650° C., preferably from 450° to 550° C.

According to the U.S. patent specification 2,407,828 a hydrocarbon is contacted in a continuous process with cupric chloride at temperatures of from 325° to 500° C. The hydrocarbon is chlorinated and the cupric chloride is converted into cuprous chloride. The latter is converted again into cupric chloride in a separate reaction zone by treatment with an oxygen-containing gas and hydrogen chloride at temperatures of from 250° to 475° C. The copper chloride may be applied to solid carriers but is preferably employed in the form of a melt. In order to reduce the melting point, chlorides of alkali metals, lead, zinc, silver and/or thallium are added.

It has now been found that the chlorination of hydrocarbons with the aid of copper chloride may be carried out with important advantages by means of a composition which contains in addition to cupric chloride, chlorides of one or more rare earth metals and one or more alkali metals.

The invention may be defined as relating to a process for the chlorination of hydrocarbons, in which these hydrocarbons are contacted in the gaseous state with compositions containing cupric chloride and one or more alkali metal chlorides, the characterizing feature being that these compositions also contain one or more chlorides of the rare earth metal group, including scandium, yttrium, zirconium, thorium and uranium.

The said compositions, which will be referred to hereinafter as compositions for short, may be mixtures of the various chlorides but certain chlorides may occur in these compositions in the form of compounds with each other.

The rare earth metal group is defined in the literature in various ways. In a narrower sense the rare earth metals are the 15 elements having atomic numbers of from 57 to 71, the so-called lanthanides. In this specification, 5 other elements, namely, scandium, yttrium, zirconium, thorium and uranium, are meant in addition to those just referred to. For the sake of brevity, the term "rare earth metals" is used in this specification to denote both the lanthanides and the 5 other elements.

In the form of the compositions as used according to the invention, the cupric chloride has a much higher activity than when used as such or when mixed with alkali metal chlorides only. According to the invention, the chlorination of hydrocarbons therefore proceeds rapidly and, if desired, at a relatively low temperature, for example, between 100° and 300°, particularly between 175° and 275° C. The great advantages of such temperatures are that the copper chloride hardly, if at all, volatilizes and there is hardly any corrosion. Another important feature is the high selectivity with which the chlorinations according to the invention may proceed. Thus alkenes may be substantially completely converted into dichloroalkanes, in which there is only addition of chlorine and no substitution. In addition, the present process may be very suitably carried out in a fluidized bed.

In the present chlorination process cupric chloride is converted into cuprous chloride. In order to ensure that this latter is reconverted into cupric chloride, i.e., that the cupric chloride can be regenerated, the composition may be contacted with chlorine, if desired with a chlorine-containing gas mixture. It is also possible to contact the composition with oxygen or oxygen-containing gases (for example, air) and with hydrogen chloride. Oxygen (air) and hydrogen chloride may be successively passed over the composition which is to be regenerated, in which operation cupric oxychloride is first formed which is converted by reaction with hydrogen chloride into cupric chloride. It is also possible to pass a mixture of oxygen (air) and hydrogen chloride over the composition, in which case the conversion of cuprous chloride into cupric chloride takes place in one operation. It is preferred to use mixtures in which oxygen and hydrogen chloride occur in an approximate stoichiometric ratio, but it is quite possible to depart from this ratio. The regeneration temperature may be approximately the same and the chlorination temperature, i.e., for instance in the range of from 200° to 300° C., but if desired, it may be outside this range.

The chlorination of hydrocarbons and regeneration of the cupric chloride may be carried out by entirely separate operations, but they may also very suitably be combined in a single operation. In the latter case, only one gas mixture need be passed over the composition, which gas mixture contains in addition to the hydrocarbon(s) to be chlorinated, chlorine or instead of chlorine or in combination therewith oxygen and hydrogen chloride, and if desired, diluents such as nitrogen.

In this manner a stationary condition can be established in the composition, under which condition the same quantity of cuprous chloride is formed per unit of time as is reconverted into cupric chloride. The composition has now the character of a catalyst which accelerates reactions in a gas mixture and remains chemically unaffected throughout the reactions.

Among the chlorides of alkali metals preference is given to potassium chloride although, for example, the chlorides of sodium and lithium give very good results. If a low melting point of the composition is desired, it is advisable to use mixtures of alkali metal chlorides. For the same purpose, compounds, preferably chlorides of other metals, such as silver, lead, or tin, may also be incorporated in the mixture.

With regard to the choice of rare earth metals, the mixture known as didymium is recommended. This mixture mainly comprises lanthanum and neodymium, together with smaller quantities of praseodymium and samarium. The following analysis is given by way of example, $La_2O_3$ 45%, $Nd_2O_3$ 38%, $Pr_6O_{11}$ 11%, $Sm_2O_3$ 4%, various 2%. Cerium is also very suitable.

The ratio of copper to rare earth metals may vary within wide limits. The ratio of parts by weight of Cu in the combined copper compounds to parts by weight of rare earth metal in the combined compounds of rare earth metals is generally between 3:1 and 1:3. Suitable values of the ratio of alkali metal to copper are generally between 0.3 and 3 (expressed in atoms) preferably between 0.8 and 1.2 (expressed in atoms).

Since the mixtures of chlorides employed according to the invention melt at a much lower temperature than the chlorides themselves, these mixtures may be entirely or partly liquid during chlorination and/or regeneration. But very good results are also obtained with compositions which are present during the chlorination and/or the regeneration in the solid state.

The compositions are preferably supported on carriers. Various materials (pumice, ceramic material, etc.) usually employed as such in related processes may also be used as carriers in the present case, but by far the best results are obtained wtih silica gel as carrier, particularly with silica gel having a surface area of at least 200 sq. meter/ gram with an average pore diameter of at least 60 A.

The carrier-supported compositions generally have a copper content in the range of from 1 to 20% by weight, calculated as metal referred to, to the total quantity of metal plus carrier. The total rare earth metal content generally lies within corresponding limits, calculated in the same manner.

The use of fluidized beds has been referred to above. The present compositions can be suitably fluidized, particularly when they are supported, either in a solid state or in the form of a melt, on a suitable carrier. The compositions having a suitable particle size may be brought into the fluidized state by means of ascending streams of the gas which it is desired to react with the copper chlorides. If silica gel is used as carrier, a suitable particle size lies, for example, between 0.02 and 0.12 mm. or 0.2 and 0.3 mm.

As stated above, the invention has the important advantage that it permits the highly selective chlorination of alkenes to dichloroalkanes. Thus, for example, ethylene may be practically quantitatively converted at approximately 250° C. into symmetric dichloroethane. These results are all the more remarkable since prior chlorination methods in which use was made of cupric chloride are known to show a very low activity.

The process according to the invention may also be used for the substitution chlorination of saturated aliphatic and cyclo-aliphatic hydrocarbons and aromatic hydrocarbons.

The process of the invention may be carried out at atmospheric pressure but, if desired, also at lower or higher pressure.

EXAMPLE I

Production of the composition

The carrier used was silica gel having an average pore diameter of 140 A and a surface area of 313 sq. m./g. This carrier was dried for 2 hours at 500° C. and subsequently impregnated with a solution of the chlorides of copper, didymium and potassium. The impregnated carrier was again dried and heated for 3 hours to 250° C. in an air stream. The respective contents of copper, didymium and potassium were 10, 5, and 6.2% by weight, calculated as metal referred to the sum of the metals present plus the carrier.

Chlorination of ethylene

Ethylene was passed over a fixed bed of the composition at a space velocity of 67 liters (in gaseous form) per kg. of composition plus carrier per hour. The pressure was the atmospheric pressure.

The results at three reaction temperatures were as follows:

| Reaction temperature, °C | 225 | 250 | 275 |
|---|---|---|---|
| Time required for complete conversion of $CuCl_2$ into $Cu_2Cl_2$, min | 80 | 40 | 35 |
| Quantity of chlorinated hydrocarbons per kg. of composition plus carrier, g | 60 | 64 | 65.5 |
| Quantity of $C_2H_4Cl_2$ per kg. of composition plus carrier, g | 60 | 64 | 63.5 |
| Efficiency of the chlorination agent, percent | 93 | 99.2 | 100 |
| Selectivity of the $C_2H_4$ conversion, percent | 99 | 100 | 97 |
| $C_2H_4Cl_2$ in the liquid reaction product, percent by weight | >99.8 | >99.5 | 97 |

The efficiency of the chlorination agent is here defined as the quantity of $Cl_2$ given off by $CuCl_2$ in the chlorination reaction divided by the quantity of $Cl_2$ which would have been given off if the reaction $2CuCl_2 \rightarrow Cu_2Cl_2 + Cl_2$ would have been complete ×100. The selectivity of the $C_2H_4$ conversion is here defined as a quantity of $C_2H_4$ converted into $C_2H_4Cl_2$ divided by the quantity of $C_2H_4$ totally converted ×100.

The conversion rate of $C_2H_4$ at different times of the chlorination may be evaluated with respect to the following figures.

| Time elapsed since beginning, min. | Percent $C_2H_4$ of the ethene passed through and converted at— | | |
|---|---|---|---|
| | 225° C. | 250° C. | 275° C. |
| 5 | 55 | 85 | 90 |
| 10 | 46 | 76 | 87 |
| 15 | 35 | 57 | 57 |
| 20 | 28 | 25 | 20 |
| 25 | 21 | 11 | 7 |
| 30 | 16 | 5 | 3 |
| 35 | 12 | 2 | 0 |
| 40 | 10 | 0 | |
| 50 | 8 | | |
| 70 | 2 | | |
| 80 | 0 | | |

EXAMPLE Ia

[For the purpose of comparison, not according to the invention]

The carrier used was pumice substantially consisting of 72.2% of $SiO_2$, 13.7% of $Al_2O_3$, 6.5% of $K_2O$ and 4.7% of $Na_2O$. This carrier was impregnated in the manner indicated in Example I with copper chloride. The resultant composition contained 10% of Cu, calculated in the manner as indicated in Example I, but contained no rare earth metals.

Ethylene was passed over a fixed bed of this composition at 250° C. After two hours only 70% of the $CuCl_2$ was converted into $Cu_2Cl_2$. Although when ethylene was passed over at 300° C., 85% of the $CuCl_2$ was converted into $Cu_2Cl_2$ in 30 minutes, the liquid product contained less than 95% of 1,2-dichloroethane and in addition nine other chlorinated products.

EXAMPLE II

The composition was prepared according to Example I, but the contents of copper, didymium and potassium were 1, 1 and 0.6% by weight respectively.

A mixture of 720 ml. of air, 600 ml. of gaseous HCl and 300 ml. of ethylene was passed over 10 grams of this composition at 275° C. per hour. The conversion was 93% for oxygen and HCl a well as for ethene, the product containing 98.5% of dichloroethane. There was no formation of $CO_2$ (0.05%).

This experiment was duplicated at 250° C. the conditions being otherwise the same. In this case the conversion of $O_2$, HCl and ethene was 70%, the product containing 99.3% of 1,2-dichloroethane.

I claim as my invention:

1. The ethylene chlorination process consisting essentially of contacting ethylene in vapor phase, at a temperature of from about 100 to about 300° C., with a composition consisting essentially of (A) cupric chloride in combination with (B) didymium chloride and (C) an alkali metal chloride, said composition containing a weight ratio of copper to didymium, calculated on the basis of uncombined metals, in the range of from about 3:1 to about 1:3, and an atomic ratio of alkali metal to copper in the range of from about 0.3:1 to about 3:1.

2. The ethylene chlorination process consisting essentially of contacting ethylene in admixture with hydrogen chloride and an oxygen-containing gas, in vapor phase, at a temperature of from about 100 to about 300° C., with a combination catalyst consisting essentially of (A) a copper chloride in combination with (B) didymium chloride, (C) an alkali metal chloride, and (D) a silica gel support, said combination catalyst containing a weight ratio of copper to didymium, calculated on the basis of uncombined metals, in the range of from about 3:1 to about 1:3, and an atomic ratio of alkali metal to copper in the range of from about 0.3:1 to about 3:1.

3. A process as claimed in claim 2, characterized in that the catalyst composition referred to in claim 2 is in the fluidized state.

4. The process for chlorinating ethylene consisting essentially of contacting ethylene in admixture with hydrogen chloride and an oxygen-containing gas, in vapor phase, at a temperature of from about 175 to 275° C., with a catalyst composition consisting essentially of (A) a copper chloride in combination with (B) didymium chloride, (C) an alkali metal chloride, and (D) a silica gel catalyst support, said catalyst composition containing from about 1 to about 20% by weight of copper and from about 1 to about 20% by weight of didymium, calculated as uncombined metals, and an atomic ratio of alkali metal to copper in the range of from about 0.8:1 to about 1.2:1.

5. The process for chlorinating ethylene consisting essentially of contacting ethylene in admixture with hydrogen chloride and an oxygen-containing gas, in vapor phase, at a temperature of from about 175 to about 275° C., with a catalyst composition consisting essentially of (A) a copper chloride in combination wtih (B) didymium chloride, (C) potassium chloride, and (D) a silica gel catalyst support, said catalyst composition containing from about 1 to about 20% by weight of copper and from about 1 to about 20% by weight of didymium, calculated as uncombined metals, and an atomic ratio of potassium to copper in the range of from about 0.8:1 to about 1.2:1.

6. The process for chlorinating ethylene consisting essentially of contacting ethylene in admixture with hydrogen chloride and an oxygen-containing gas, in vapor phase, at a temperature of from about 175 to about 275° C., with a catalyst composition consisting essentially of (A) a copper chloride in combination with (B) didymium chloride, (C) sodium chloride, and (D) a silica gel catalyst support, said catalyst composition containing from about 1 to about 20% by weight of copper and from about 1 to about 20% by weight of didymium, calculated as uncombined metals, and an atomic ratio of sodium to copper in the range of from about 0.8:1 to about 1.2:1.

7. The process for chlorinating ethylene consisting essentially of contacting ethylene in admixture with hydrogen chloride and an oxygen-containing gas, in vapor phase, at a temperature of from about 175 to about 275° C., with a catalyst composition consisting essentially of (A) a copper chloride in combination with (B) didymium chloride, (C) lithium chloride, and (D) a silica gel catalyst support, said catalyst composition containing from about 1 to about 20% by weight of copper and from about 1 to about 20% by weight of didymium, calculated as uncombined metals, and an atomic ratio of lithium to copper in the range of from about 0.8:1 to about 1.2:1.

References Cited by the Examiner

UNITED STATES PATENTS

| | | | |
|---|---|---|---|
| 1,591,984 | 7/26 | Krause et al. | 260—659 |
| 1,654,821 | 1/28 | Krause et al. | 260—659 |
| 2,271,056 | 1/42 | Balcar | 23—219 |
| 2,308,489 | 1/43 | Cass | 260—659 |
| 2,334,033 | 11/43 | Riblett | 260—659 |
| 2,447,323 | 8/48 | Fontana | 260—659 |
| 2,636,864 | 4/53 | Pye et al. | 260—659 |
| 2,838,577 | 6/58 | Cook et al. | 260—662 |
| 2,952,714 | 9/60 | Milam et al. | 260—662 |
| 2,957,924 | 10/60 | Heiskell et al. | 260—662 |

FOREIGN PATENTS

| | | |
|---|---|---|
| 167,846 | 11/53 | Australia. |
| 108,421 | 12/21 | Austria. |
| 517,009 | 9/55 | Canada. |

LEON ZITVER, *Primary Examiner.*

ALPHONSO D. SULLIVAN, *Examiner.*